United States Patent
Han et al.

(10) Patent No.: US 11,325,590 B2
(45) Date of Patent: May 10, 2022

(54) AUTONOMOUS DRIVING DEVICE AND DRIVING METHOD THEREOF

(71) Applicant: SAMSUNG ELECTRONICS CO., LTD., Suwon-si (KR)

(72) Inventors: Seongwon Han, Suwon-si (KR); Woojin Park, Suwon-si (KR); Daehyun Ban, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 16/243,370

(22) Filed: Jan. 9, 2019

(65) Prior Publication Data
US 2019/0263393 A1    Aug. 29, 2019

(30) Foreign Application Priority Data
Feb. 28, 2018  (KR) .................. 10-2018-0024211

(51) Int. Cl.
| | | |
|---|---|---|
| *B60W 30/09* | (2012.01) | |
| *G05D 1/00* | (2006.01) | |
| *B60W 10/20* | (2006.01) | |
| *B60W 30/095* | (2012.01) | |
| *B60W 10/04* | (2006.01) | |

(52) U.S. Cl.
CPC ............ *B60W 30/09* (2013.01); *B60W 10/04* (2013.01); *B60W 10/20* (2013.01); *B60W 30/0956* (2013.01); *G05D 1/0055* (2013.01); *G05D 1/0088* (2013.01); *B60W 2554/00* (2020.02);
(Continued)

(58) Field of Classification Search
CPC .. B60W 30/09; B60W 10/20; B60W 30/0956; B60W 10/04; B60W 2554/00; B60W 2720/106; B60W 2710/20; B60W 60/001; B60W 2556/45; B60W 10/184; B60W 30/14; B60W 30/08; G05D 1/0088; G05D 1/0055; G05D 2201/0213; G05D 1/0214; G05D 1/0223
See application file for complete search history.

(56) References Cited

U.S. PATENT DOCUMENTS

| | | |
|---|---|---|
| 9,656,667 B2 | 5/2017 | Agnew et al. |
| 9,827,985 B2 | 11/2017 | Yoo et al. |
| | (Continued) | |

FOREIGN PATENT DOCUMENTS

| | | |
|---|---|---|
| JP | 2015-140181 | 8/2015 |
| JP | 2017-041070 | 2/2017 |
| | (Continued) | |

*Primary Examiner* — Michael V Kerrigan
(74) *Attorney, Agent, or Firm* — Nixon & Vanderhye P.C.

(57) ABSTRACT

An autonomous driving device is provided. The autonomous driving device includes a driver comprising circuitry configured to drive the autonomous driving device, a sensor, a storage configured to store characteristic information for each type of obstacle, and a processor configured to control the driver based on a result of sensing of the sensor. The processor is configured to, based on an external object sensed by the sensor being recognized as an obstacle with a possibility of collision with the autonomous driving device, identify a type of the obstacle based on the characteristic information, and to control the driver to change at least one of a velocity and direction of the autonomous driving device based on the identified type of obstacle.

14 Claims, 9 Drawing Sheets

(52) U.S. Cl.
CPC ... *B60W 2710/20* (2013.01); *B60W 2720/106* (2013.01); *G05D 2201/0213* (2013.01)

(56) References Cited

U.S. PATENT DOCUMENTS

| | | | |
|---|---|---|---|
| 2017/0132334 A1* | 5/2017 | Levinson | G06F 30/20 |
| 2017/0144657 A1* | 5/2017 | Hassani | B60W 30/0953 |
| 2017/0221366 A1 | 8/2017 | An et al. | |
| 2017/0240177 A1 | 8/2017 | Fujii et al. | |
| 2017/0248434 A1 | 8/2017 | Best | |
| 2018/0151066 A1 | 5/2018 | Oba | |
| 2018/0208185 A1* | 7/2018 | Nagraj Rao | B60W 30/09 |
| 2018/0281786 A1* | 10/2018 | Oyaizu | B62D 15/0265 |

FOREIGN PATENT DOCUMENTS

| | | |
|---|---|---|
| KR | 10-1610544 | 4/2016 |
| KR | 10-2017-0090672 | 8/2017 |

\* cited by examiner

41

42

43

100

44

45

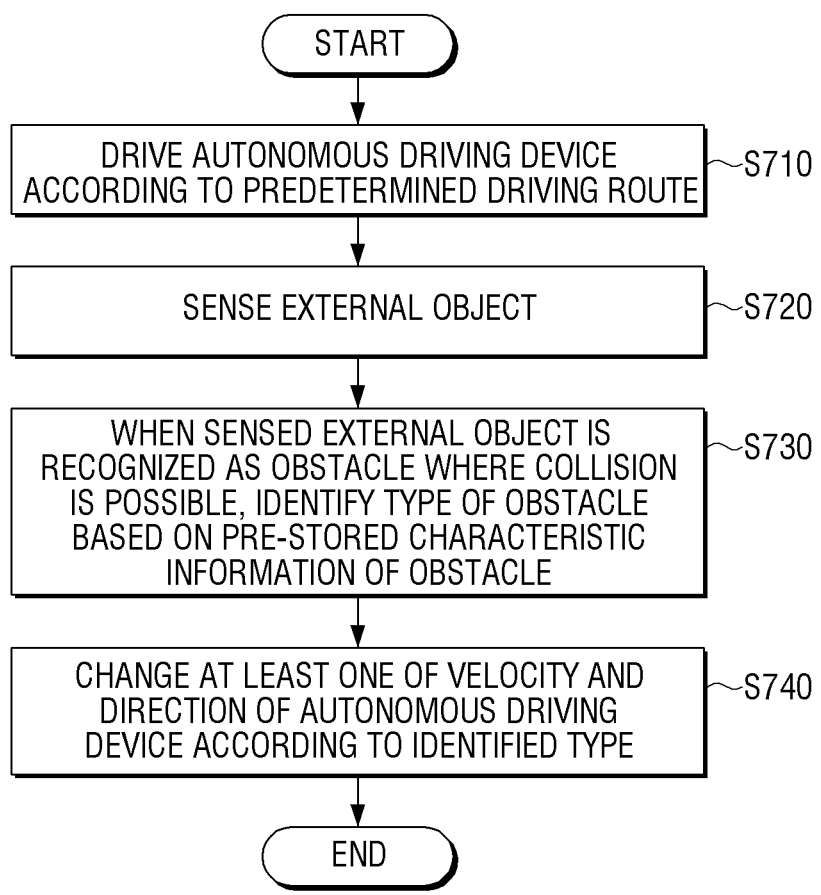

AUTONOMOUS DRIVING DEVICE AND DRIVING METHOD THEREOF

CROSS-REFERENCE TO RELATED APPLICATION

This application is based on and claims priority under 35 U.S.C. § 119 to Korean Patent Application number 10-2018-0024211, filed on Feb. 28, 2018, in the Korean Intellectual Property Office, and the disclosure of which is incorporated by reference herein in its entirety.

BACKGROUND

1. Field

The disclosure relates to an autonomous driving device and a driving method thereof. For example, the disclosure relates to an autonomous driving device determining a driving method based on a type of obstacle, and a driving method thereof.

2. Description of Related Art

The advancement of electronic technologies has developed and supplied various types of electronic devices. Particularly, developments on home robots, industrial robots and vehicles that are autonomously driven in various places such as home, office, public place and the like have been widely conducted.

A related-art autonomous driving device is operated by, when a peripheral obstacle with collision possibility is suddenly sensed, setting sudden break to avoid collision or abruptly changing directions. However, in the presence of another vehicle nearby or when a road condition is bad, there is a problem that this driving method may bring about more damages.

Accordingly, to more efficiently control driving based on a type of obstacle, a context, etc., a technology that puts security of a user at a top priority is demanded.

The above information is presented as background information to assist with an understanding of the disclosure. No determination has been made, and no assertion is made, as to whether any of the above might be applicable as prior art with regard to the disclosure.

SUMMARY

Aspects of the disclosure address at least the above-mentioned problems and/or disadvantages and to provide at least the advantages described below. Accordingly, an aspect of the disclosure is to provide an autonomous driving device for controlling driving an autonomous driving device based on a type of obstacle, and a driving method.

In accordance with an aspect of the disclosure, an autonomous driving device is provided. The autonomous driving device includes a driver comprising circuitry configured to drive the autonomous driving device, a sensor, a storage configured to store characteristic information for each type of obstacle, and a processor configured to control the driver based on a result of sensing of the sensor. The processor may be configured to, based on an external object sensed by the sensor being recognized as an obstacle with a possibility of collision with the autonomous driving device, to identify a type of the obstacle based on the characteristic information, and to control the driver to change at least one of a velocity and direction of the autonomous driving device based on the identified type of obstacle.

The processor may be configured to, based on a plurality of obstacles being present, control the driver to change a direction of the autonomous driving device toward an obstacle with a minimum (or relatively reduced) on-collision damage from among the plurality of obstacles.

The processor may be configured to, based on the obstacle being a person or a structure, control the driver to control the autonomous driving device to come to a sudden stop, and/or to change a direction of the autonomous driving device to a direction in which a collision with the obstacle is avoided.

The processor may be configured to, based on the obstacle being an animal other than human and/or a fixed object of a shock absorption material, control the driver to decelerate the autonomous driving device, and to maintain a direction of autonomous driving device.

The processor may be configured to, based on the obstacle being a moving object provided with an autonomous driving function, control the driver to change a direction of the autonomous driving device to a route on which a collision with the moving object is avoided, and to decelerate the autonomous driving device based on a steering angle of the moving object and a degree of velocity change of the moving object.

The autonomous driving device may further include a communication interface comprising circuitry configured to communicate with a moving object provided with an autonomous driving function. The processor may be configured to receive driving information of the moving object via the communication interface, to compare the driving information with driving information of the autonomous driving device, and based on a collision being possible, to change a driving route of the autonomous driving device. The driving information may include at least one of a current location, a velocity, a direction, and a route.

The processor may be configured to, based on a plurality of moving objects being present, set an update period of driving information based on driving information of a moving body with a maximum possibility of collision, and to identify (determine) a possibility of collision with the moving object every update period of driving information.

The processor may be configured to, based on the driving route of the autonomous driving device being changed, transmit information relating to the changed route to the moving object via the communication interface, and based on receiving route identification information from the moving object, to control the driver to drive the autonomous driving device along the changed driving route.

In accordance with another aspect of the disclosure, a method for driving an autonomous driving device is provided. The method includes driving the autonomous driving device to be driven along a predetermined driving route, sensing an external object, identifying a type of the obstacle based on the characteristic information based on the sensed external object being sensed as an obstacle with a possibility of collision with the autonomous driving device, and changing at least one of a velocity and direction of the autonomous driving device based on the identified type of obstacle.

The changing at least one of the velocity and direction of the autonomous driving device may include, based on a plurality of obstacles being present, changing a direction of the autonomous driving device toward an obstacle with a minimum (or relatively reduced) on-collision damage from among the plurality of obstacles.

The changing at least one of the velocity and direction of the autonomous driving device may include, based on the obstacle being a person or a structure, controlling the driver to control the autonomous driving device to come to a sudden stop, and/or to change a direction of the autonomous driving device to a direction in which a collision with the obstacle is avoided.

The changing at least one of the velocity and direction of the autonomous driving device may include, based on the obstacle being an animal other than human or a fixed object of a shock absorption material, controlling the driver to decelerate the autonomous driving device, and to maintain a direction of autonomous driving device.

The changing at least one of the velocity and direction of the autonomous driving device may include, based on the obstacle being a moving object provided with an autonomous driving function, controlling the driver to change a direction of the autonomous driving device to a route on which a collision with the moving object is avoided, and/or to decelerate the autonomous driving device based on a steering angle of the moving object and a degree of velocity change of the moving object.

The changing at least one of the velocity and direction of the autonomous driving device may include receiving driving information of the moving object via the communication interface, comparing the driving information with driving information of the autonomous driving device, and based on a collision being possible, changing a driving route of the autonomous driving device. The driving information may include at least one of a current location, a velocity, a direction, and a route.

The method may further include, based on a plurality of moving objects being present, setting an update period of driving information based on driving information of a moving body with a maximum possibility of collision, and identifying (determining) a possibility of collision with the moving object every update period of driving information.

The changing at least one of the velocity and direction of the autonomous driving device may include, based on the driving route of the autonomous driving device being changed, transmitting information relating to the changed route to the moving object via the communication interface, and based on receiving route identification information from the moving object, controlling the driver to drive the autonomous driving device along the changed driving route.

According to the various example embodiments, in a case that collision between an autonomous driving device and an obstacle is expected, it is possible to efficiently avoid and/or reduce risks based on a type of obstacle.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following detailed description, taken in conjunction with the accompanying drawings, in which:

FIG. 7 is a flowchart illustrating an example method for driving an autonomous driving device, according to an example embodiment.

The same reference numerals are used to represent the same elements throughout the drawings.

DETAILED DESCRIPTION

Figure 1:
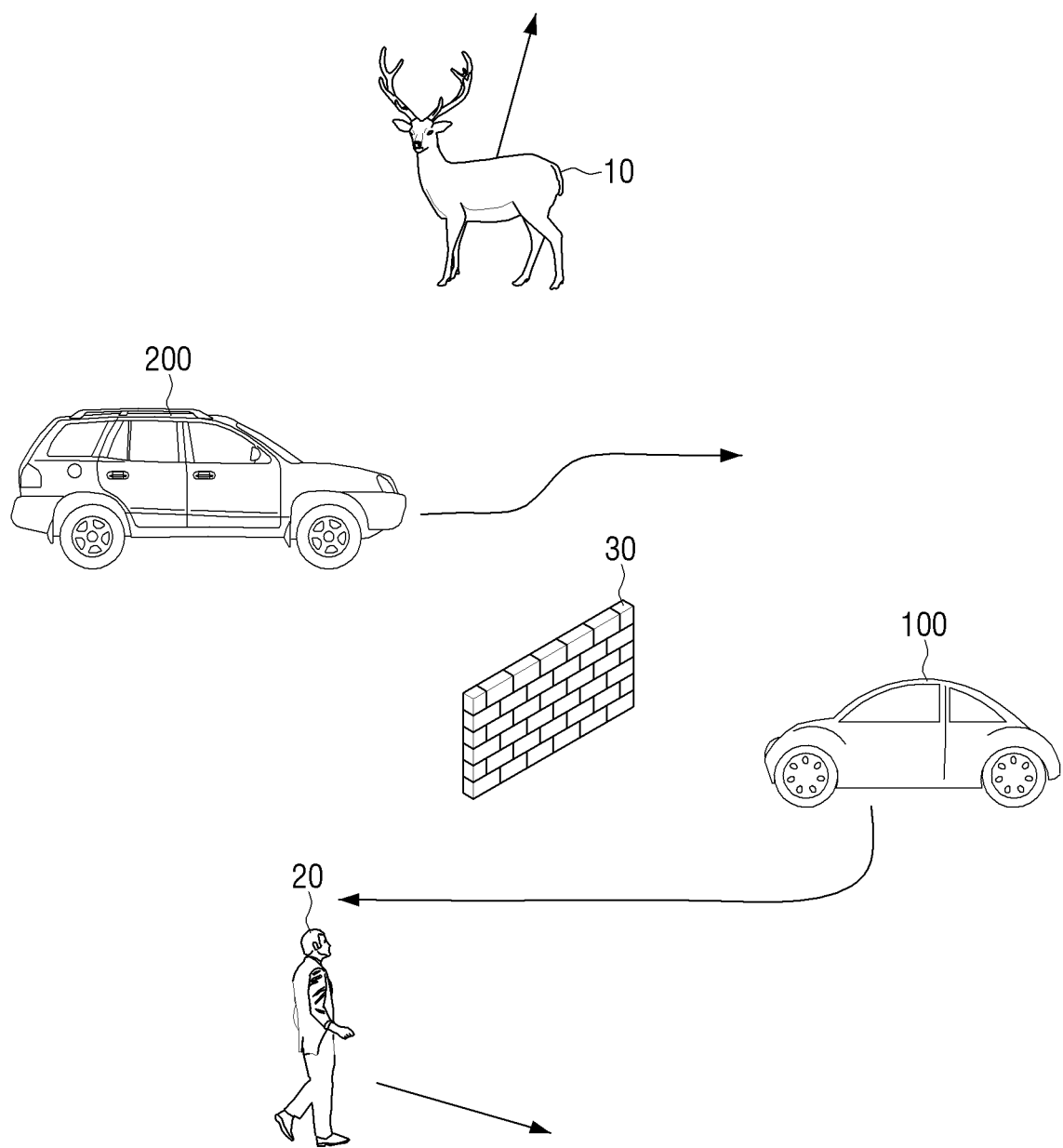
FIG. 1 is a diagram illustrating an example operation of an autonomous driving device, according to an example embodiment.

Hereinafter, the terms used in example embodiments will be briefly explained, and example embodiments will be described in greater detail with reference to the accompanying drawings.

The terms used in the example embodiments of the present disclosure are general terms which are widely used now and selected considering the functions of the present disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Accordingly, the terms used in the description should not necessarily be understood as simple names of the terms, but may be defined based on meanings of the terms and overall contents of the present disclosure.

The example embodiments may vary, and may be provided in different example embodiments. Various example embodiments will be described with reference to accompanying drawings. However, this does not necessarily limit the scope of the example embodiments to a specific embodiment. Instead, modifications, equivalents and replacements included in the disclosed concept and technical scope of this disclosure may be employed. While describing example embodiments, if it is determined that the specific description regarding a known technology obscures the gist of the disclosure, the specific description may be omitted.

In the present disclosure, relational terms such as first and second, and the like, may be used to distinguish one entity from another entity, without necessarily implying any actual relationship or order between such entities. In embodiments of the present disclosure, relational terms such as first and second, and the like, may be used to distinguish one entity from another entity, without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the present disclosure, a 'module' or a 'unit' performs at least one function or operation and may be implemented by hardware or software or any combination of the hardware and the software. In addition, a plurality of 'modules' or a plurality of 'units' may be integrated into at least one module and may be realized as at least one processor except for 'modules' or 'units' that should be realized in a specific hardware.

The above and other aspects of the present disclosure will become more apparent from the description of the following example embodiments thereof with reference to the accompanying drawings. However, example embodiments may be realized in a variety of different configurations, and are not limited to descriptions provided herein. Further, those descriptions that are irrelevant to understanding the various example embodiments may by omitted so as to describe example embodiments more clearly, and similar drawing reference numerals are used for the similar elements throughout the description.

FIG. 1 is a diagram illustrating an example operation of an autonomous driving device, according to an example embodiment.

The autonomous driving device may refer, for example, to a device including various circuitry capable of autonomous driving without intervention of a driver. The autonomous driving device may be implemented as a vehicle. However, the example is not limited thereto, and the autonomous driving device may be implemented as a variety of means of transportation such as, for example, and without limitation, two wheels vehicles, robots, air vehicles, and the like. In the disclosure, it is assumed that the autonomous driving device is implemented as a vehicle for convenience of explanation.

Referring to FIG. 1, a situation where the autonomous driving device 100 may collide with a variety of obstacles 10, 20, 30 and 200 while the device is driven. The autonomous driving device 100 may store different information for each obstacle type in advance. When an obstacle is recognized, the autonomous driving device 100 may identify a type of the obstacle, and control a traveling method of the autonomous driving device according to the identification result.

For example, the autonomous driving device 100 may identify an obstacle type as a moving object 200 such as an animal 10, a pedestrian 20, a structure 30, and an autonomous driving vehicle.

In the disclosure, the animal 10 may refer, for example, to a term that commonly calls animals other than human. The animal 10 moves slower than devices such as a vehicle and the like. In addition, the animal 10 may stop motion due to a feature right before collision with the autonomous driving device 100. Accordingly, it may be considered that the avoidance when a collision is expected is low. Although there is a difference according to an animal size, it may be considered that a damage at the time of collision is low as compared with a hard object such as a wall, a peripheral vehicle, and the like.

It may be identified (determined) that the pedestrian 20 moves slow too, and has a low avoidance when a collision is expected, and that a damage at the time of collision is high. When a damage at the time of collision is identified, not only whether the vehicle is damaged but also a security of the pedestrian 20 are important. Thus, a damage at the time of collision may be set high for the pedestrian 20.

On the other hand, it may be identified (determined) that the structure 30 does not move, has no avoidance when a collision is expected, and that a damage at the time of collision is high. In a case that the moving object 200 such as a vehicle and the like is an obstacle, it may be identified that the obstacle has a high moving speed, has a high avoidance when a collision is expected, and that a damage is high at the time of collision.

The autonomous driving device 100 may avoid a path for avoiding collision with the autonomous driving device 100 and/or reducing risks at the time of collision based on a type of the identified obstacle. For example, if it is possible to avoid collision, the autonomous driving device 100 may drive on a path on which the device 100 is capable of avoiding collision, and if it is impossible to avoid collision, the autonomous driving device 100 may drive on a path for minimizing and/or reducing damages to the autonomous driving device 100 or the obstacle at the time of collision.

In a case that the obstacle type is an autonomous driving vehicle 200, driving information may be communicated between the autonomous driving device 100 and the autonomous driving vehicle 200, and thereby a driving path may be negotiated and a path of the autonomous driving device 100 may be identified. However, the example is not limited to a case where the autonomous driving device 100 and the external device 200 are respectively an autonomous driving vehicle. As described above, the example may include various autonomous driving device capable of autonomously driving.

Figure 2:
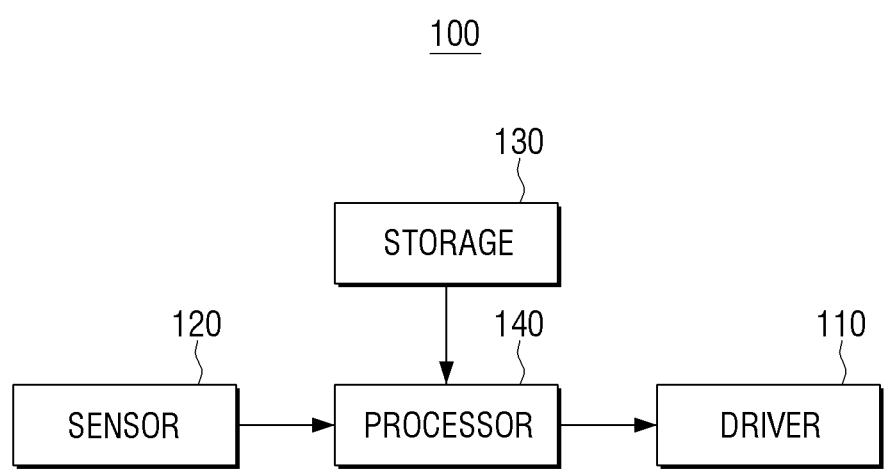
FIG. 2 is a block diagram illustrating an example configuration of an autonomous driving device, according to an example embodiment.

FIG. 2 is a block diagram illustrating an example configuration of an autonomous driving device, according to an example embodiment.

Referring to FIG. 2, an autonomous driving device 100 may include a driver (e.g., including circuitry) 110, a sensor 120, a storage 130, and a processor (e.g., including processing circuitry) 140.

The driver 110 may, for example, be a configuration for driving the autonomous driving device 100 and may include various circuitry. In a case that the autonomous driving device 100 is implemented as a vehicle, the driver 110 may include various circuitry, such as, for example, and without limitation, elements for driving, such as propulsion, brake, speed, direction, and the like. For example, the driver 110 may include various machine components, such as, for example, and without limitation, an engine unit, a steering unit, a break unit and the like, and/or software. The elements of the driver 110 may be implemented the same as the elements of a normal vehicle, and thus repeated explanation is not provided.

The sensor 120 may sense a surrounding environment of the autonomous driving device 100. The sensor 120 may be implemented as various types of sensors and the assembly thereof, such as, for example, and without limitation, a camera, a depth camera, a motion sensor, an infrared sensor, an ultrasonic sensor, a laser sensor, and the like, and the use location and number thereof may differ depending on the type and size of the autonomous driving device 100.

The storage 130 may, for example, be an element for storing various software and data required for an operation of the autonomous driving device 100. For example, the storage 130 may store characteristic information for each obstacle type. The characteristic information may include, for example, and without limitation, a size, color and shape of an object, a reaction velocity when a collision is expected, a movement direction when a collision is expected, a damage at the time of collision, or the like, but is not limited thereto. A manufacturer of the autonomous driving device 100 or an additional data manager may monitor characteristics of various types of obstacles through repeated experiments, and generate characteristic information based on a monitoring result. In this case, characteristic information may be generated based on a big data obtained from information collected from a number of servers.

In addition, the storage 130 may store a driving algorithm of a plurality of different autonomous driving device.

In FIG. 2, one storage 130 is present. However, a plurality of storages 130 may be included. In addition, the storage 130 may be implemented in various types such as, for example, and without limitation, a non-volatile memory, a volatile memory, a storage, and the like, and may be implemented as an external memory device or a server which is not mounted on the autonomous driving device 100.

The processor 140 may include various processing circuitry and be configured to control overall operations of the autonomous driving device 100.

According to an example embodiment, the processor 140 may be implemented as, for example, and without limitation, a digital signal processor (DSP) for processing digital signals, a microprocessor, a time controller (TCON), or the like. However, the example is not limited thereto. The processor 140 may include one or more from among various processing circuitry, such as, for example, and without limitation, one or more of a dedicated processor, a central processing unit (CPU), a micro controller unit (MCU), a micro processing unit (MPU), a controller, application processor (AP), communication processor (CP), an ARM processor, or the like. In addition, the processor 140 may be implemented as a System on Chip (SoC) in which a processing algorithm is mounted and a large scale integration (LSI), and may also be implemented in the form of a field programmable gate array (FPGA).

The processor 140 may control the driver 110 based on a result sensed by the sensor 120. In a case that the sensor 120 includes an image sensor, the sensor 120 may provide, to the processor 140, an image for which a peripheral area of the autonomous driving device 100 is captured. The processor 140 may analyze the provided image and detect an object. The processor 140 may identify whether there is a possibility that the detected object will collide with the autonomous driving device 100, and identify whether the detected object is an obstacle.

For example, the processor 140 may divide all pixels included in the image into a plurality of pixel groups, and then calculate a characteristic value of the respective pixel groups. The processor 140 may detect an edge of objects included in the image based on the calculated characteristic value, and separate each of the objects according to the edge and identify a shape of each of the object. In addition, the processor 140 may identify a location of an object according to a coordinate of pixels corresponding to each of the objects from among all pixels. When the sensor 120 provides a plurality of continuously-captured images to the processor 140, the processor 140 may compare positions of an object in the respective images and calculate whether the object has been moved, a moving direction of the object, a movement speed of the object, etc. The processor 140 may identify whether there is a possibility of collision in consideration of a driving path of the autonomous driving device 100 and a position and moving direction of the object.

In addition, the processor 140 may compare a plurality of images and sense a distance from the object, and when a depth camera, a radar sensor, a lidar sensor, or etc. is provided, directly sense a distance from the object by means of those sensors.

In a case that the object and the autonomous driving device 100 are spaced apart at over a considerable distance from each other, the processor 140 may predict a future position of the object in consideration of a current position and movement speed of the object, and compare the predicted position and a driving path and identify whether there is a possibility of collision.

In addition, in a case that a distance from the object is very close as compared with a current speed of the autonomous driving device 100 and thus is within a breaking distance, the processor 140 may identify that the object is an obstacle with a collision possibility.

If a plurality of cameras are present, the processor 140 may estimate a position of the object in consideration with a camera position, rather than directly calculating the object position. For example, when the object is an object included in an image captured by a front camera, it may be identified that the object is positioned in front of the autonomous driving device 100, and that a collision possibility may be identified in consideration of only a movement direction and movement speed of the object.

When the object is identified as an obstacle with a collision possibility, the processor 140 may compare information of the object with characteristic information stored in the storage 130 and recognize a type of the obstacle.

For example, the processor 140 may identify a color of the object based on a pixel value of pixels included in a separated object, and estimate a size of the corresponding object according to the number of pixels included in the object. In this manner, when a shape, color, size, etc. of the object are detected, the processor 140 may compare them with the characteristic information stored in the storage 120 and identify a type of the obstacle.

The method and order of obstacle recognition is only an example, and the autonomous driving device 100 may recognize an obstacle in a different manner.

When the type of obstacle is identified, the processor 140 may control the driver 110 based on characteristic information according to the type.

For example, in a case that the obstacle type is a small animal, the characteristic information may include information indicating that movement is possible, that a movement speed is approximately 20 km/h, that a movement direction when a collision is expected is a left side or right side of a driving direction of the autonomous driving device 100, and that a damage at the time of collision is relatively small.

The processor 140 may predict a movement path of an obstacle based on characteristic information of the sensed obstacle, and identify a collision possibility by comparing the movement path with a driving path of the autonomous driving device. When it is identified that a collision possibility is present, the processor 140 may control the driver 110 to change at least one of a speed (velocity) and direction of the autonomous driving device.

As in the example described above, when the sensed obstacle is identified as a small animal, the processor 140 may predict a common motion of avoidance of the small animals based on the characteristic information.

For example, in a case that the autonomous driving device 100 approaches an obstacle at a velocity of 40 km/h, it may be predicted that the small animal wishes to avoid toward the left side or the right side according to the characteristic information. In this case, it may be identified that a collision possibility is not high and thus, no further driving control may be performed.

On the other hand, in a case that the autonomous driving device 100 approaches the obstacle at a velocity of 120 km/h, it may be predicted that the small animal is not capable of completely avoiding the autonomous driving device 100 in consideration of a distance from the small animal, a movement speed, etc. In this case, the processor 140 may identify the possibility of collision, and control the driver 110 to slow down the autonomous driving device 100 or to turn the steering wheel in an opposite direction to the direction of avoidance of the small animal.

Meanwhile, a plurality of obstacles may be present.

When a plurality of obstacles have a collision possibility, the processor 140 may predict a damage at the time of collision with the respective obstacles based on characteristic information corresponding to types of the obstacles, and control the driver 110 to change the direction toward an obstacle with a minimum damage at the time of collision.

For example, the processor 140 may predict a movement path of each of the plurality of obstacles based on current movement information and characteristic information of each of the plurality of obstacles. Thereafter, the processor 140 may calculate a collision possibility of each of the plurality of obstacles.

If a minimum value of a collision possibility of each of the plurality of obstacles is greater than a predetermined threshold, the processor 140 may identify that it is a collision situation.

When the collision situation is identified, the processor 140 may, based on a damage at the time of collision acquired based on the current movement information and the characteristic information, control the driver 110 to change the driving direction toward one obstacle with a minimum on-collision damage.

In accordance with another example embodiment, when a type of obstacle is a person or a structure, the processor 140 may control the driver 110 to control the autonomous driving device 100 to come to a sudden stop, and/or to change the direction to avoid collision with the obstacle.

For example, the processor 140 may identify a type of an obstacle sensed by the sensor 120 as a person or a structure. In this case, the processor 120 may identify the obstacle type as a structure of which an on-collision damage is higher than a predetermined threshold based on characteristic information corresponding to the structure.

For example, the structure may include a structure with a low shock absorption such as a wall, a telephone pole, a building, a median strip, and the like.

In this case, the driver of the autonomous driving devices 100 suffers high damage, and thus the processor 140 may control the driver 110 to change the direction toward a driving direction in which collision with the obstacle is avoided.

In addition, the processor 140 may identify the obstacle type as a person receiving a higher damage than a predetermined threshold on collision based on characteristic information corresponding to a person.

In this case, to prevent and/or avoid collision with a person, the processor 140 may control the driver 110 to change the direction toward a driving direction in which collision with the obstacle is avoided.

According to another example embodiment, when the obstacle type is an animal other than human or a fixed object of shock absorption materials, the processor 140 may drive the driver 110 to decelerate the autonomous driving device 100 and maintain a direction of the autonomous driving device 100. In this case, another obstacle may include a pedestrian, a plurality of vehicles, and a plurality of autonomous driving vehicle.

For example, in a case that an animal other than human and the following vehicle are present during driving, when it is impossible to avoid collision with the animal, the processor 140 may control the driver 110 to maintain a direction of the autonomous driving device 100 and to decelerate. It is to prevent chain collision with the following vehicle and minimize and/or reduce loss of lives.

As another example, in a case that the obstacle type is identified as a fixed object of shock absorption materials, the processor 140 may identify a damage of the fixed object of the shock absorption materials as being lower than a predetermined threshold, and then control the driver 110 to change a velocity and a direction in such a manner that a collision with another obstacle does not occur.

As another example, the processor 140 may control the driver 110 to decelerate the autonomous driving device 100 to such an extent that a collision with another obstacle does not occur. That is, the processor 140 may, in consideration of a velocity of the following vehicle or velocities of the left and right vehicles sensed by the sensor, decelerate to such a level that a collision between the autonomous driving device 100 and a vehicle adjacent thereto does not occur.

According to another example embodiment, when an obstacle is identified as a moving object with an autonomous driving function, the processor 140 may change a direction of the autonomous driving device 100 to a route on which collision with the moving object is avoided based on a steering angle and degree of velocity change of the moving object, and control the driver 110 to decelerate the autonomous driving device 100.

For example, the processor 140 may sense a steering angle and degree of velocity change of a moving object with an autonomous driving function at a current driving situation through the sensor 120, and acquire the sensed steering angle and the sensed degree of velocity change. That is, the processor 140 may, according to a distance between the autonomous driving device 100 and a moving object equipped with an autonomous driving function and a driving situation including a driving direction.

In this case, the processor 140 may identify an autonomous driving algorithm of the moving object equipped with the autonomous driving function based on a steering angle and velocity of the moving body at a current driving situation.

The processor 140 may predict an estimated direction and velocity of the moving object based on the identified autonomous driving algorithm, and control the driver 110 to change a direction of the autonomous driving device 100 and to decelerate.

For example, in a collision risk situation, the processor 140 may identify a change of steering of the moving object by +30° and a reduction of velocity by 80%, and then identify an autonomous driving algorithm of the moving object based on the identified degree of steering and the identified degree of velocity reduction.

Thereafter, the processor 140 may identify an avoidance algorithm of the moving object based on a particular autonomous driving algorithm of the identified particular moving object, and control the driver 110 to change a direction and velocity so that a collision with the moving object does not occur.

Figure 3:
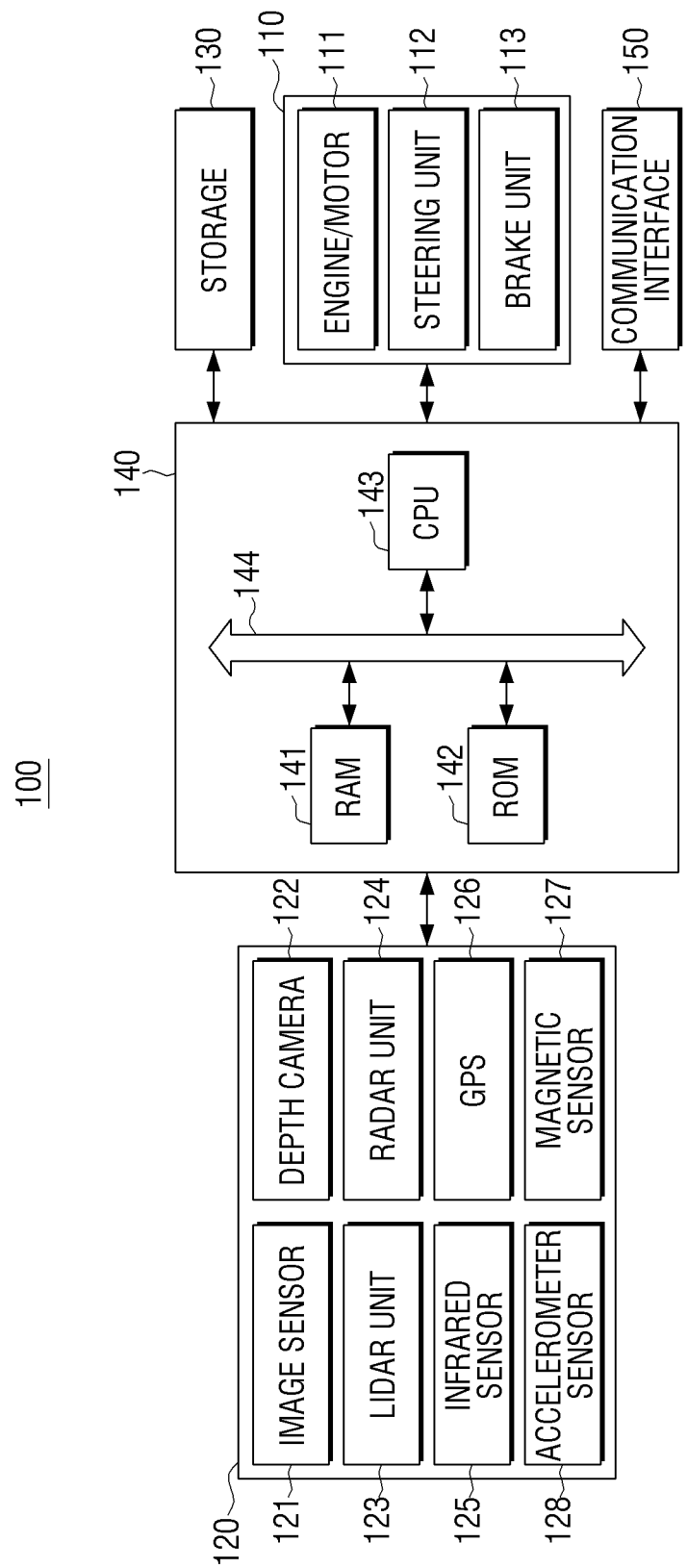
FIG. 3 is a block diagram illustrating an example configuration of an autonomous driving device, according to an example embodiment.

According to another example embodiment, the processor 140 may receive driving information of the moving object equipped with the autonomous driving function via a communication interface 150 (see, e.g., FIG. 3). In this case, the driving information may include at least one of a current location, a velocity, a direction, and a route. Here, the driving information may include estimated driving routes of the autonomous driving device 100 and the moving object.

In addition, after receiving the driving information of the moving object equipped with the autonomous driving function, the processor 140 may compare the driving information of the moving object and driving information of the autonomous driving device 100, and if a collision is possible, change a driving route of the autonomous driving device 100.

For example, the processor 140 may compare the driving information of the moving object with the driving information of the autonomous driving device 100, and identify a collision possibility on a first route as being less than a predetermined threshold, identify a collision possibility on a second route as being greater than or equal to the predetermined threshold, and identify a collision possibility on a third route as being zero.

In this case, the processor 140 may change the route from the first route the device 100 is driving to a second route or third route of which the possibility of collision is less than the first route.

In a case that a plurality of moving objects equipped with an autonomous driving function are present, the processor 140 may set an update period of driving information according to driving information of a moving object with the maximum collision possibility, and identify a possibility of collision with the plurality of moving objects for every driving information update period.

For example, the processor 140 may identify first to third moving objects equipped with an autonomous driving function. In this case, the processor 140 may compare driving information of the autonomous driving device 100 with driving information of the first to third moving objects, respectively, and identify a possibility of collision. Thereafter, the processor 140 may set a short driving information update period with respect to the first moving object of the highest collision possibility, and set a long driving information update period with respect to the third moving object of the lowest collision possibility. Accordingly, it is possible to reduce a possibility of collision between the autonomous driving device 100 and an external moving object.

Meanwhile, when a driving route of the autonomous driving device 100 is changed, the processor 140 may transmit the changed route information to a moving object equipped with an autonomous driving function, and when route identification information is received from the moving object, control the driver 110 to drive the autonomous driving device 100 along the changed driving path.

For example, the processor 140 may go through a process of exchanging driving information between the autonomous driving device 100 and an external moving object and reach an agreement with driving path, and thereby a collision can be prevented and/or avoided.

FIG. 3 is a block diagram illustrating an example configuration of an autonomous driving device, according to an example embodiment.

Referring to FIG. 3, an autonomous driving device 100 may include a driver (e.g., including circuitry) 110, a sensor 120, a storage 130, a processor (e.g., including processing circuitry) 140, and a communication interface (e.g., including communication circuitry) 150.

The driver 110 may include a variety of devices and units for driving of the autonomous driving device 100. For example, in a case that the autonomous driving device 100 is a device driving on the ground, the driver may include an engine/motor, a brake unit, and a steering unit.

The engine/motor 111 may include any combination of an internal combustion engine, an electric motor, a steam locomotive, and a stirling engine. For example, in a case that the autonomous driving device 100 is a gas-electric hybrid car, the engine/motor 211 may be a gasoline engine and an electric motor. For example, the engine/motor 111 may supply energy for the autonomous driving device 100 to drive on a predetermined driving route.

The steering unit 112 may be any combination of mechanisms included to control a direction of the autonomous driving device 100. For example, when an obstacle is recognized while the autonomous driving device 100 is driving, the steering unit 112 may change the direction of the autonomous driving device 100. In a case that the autonomous driving device 100 is a vehicle, the steering unit 112 may turn the steering wheel clockwise or counterclockwise, and change the direction of the autonomous driving device 100 accordingly.

The brake unit 113 may be any combination of mechanisms included to decelerate the autonomous driving device 100. For example, the brake unit may use friction to reduce a speed of wheels/tires. When an obstacle is recognized while the autonomous driving device 100 is driving, the brake unit 113 may decelerate the autonomous driving device 100.

In the example described above, the driver 110 is an autonomous driving device 100 driving on the ground, but is not limited thereto. The driver 110 may include a flight propulsion unit, a propeller, wings, etc. and may include a variety of vessel propulsion devices.

The sensor 120 may include a number of sensors configured to sense information relating to a surrounding environment of the autonomous driving device 100. For example, the sensor 120 may include at least one of an image sensor 121, a depth camera 122, a LIDAR unit 123, a RADAR unit 124, an infrared sensor 125, a Global Positioning System (GPS) 126, a magnetic sensor 127, and an accelerometer sensor 128.

The image sensor 121 may capture an external object located outside of the autonomous driving device 100. The captured external device may be used as a data for changing at least one of a velocity and direction of the autonomous driving device 100. The image sensor 121 may include a sensor of various types, such as a charge coupled device (CCD) and a complementary metal oxide semiconductor (CMOS). In addition, the depth camera 122 may acquire a depth for determining a distance between the autonomous driving device 100 and an external object.

The LIDAR unit 123, the RADAR unit 124 and the infrared sensor 125 may be a sensor configured to output a particular signal and sense external objects in an environment in which the autonomous driving device 100 is located. For example, the LIDAR unit 123 may include a laser light source and/or laser scanner configured to radiate a laser, and a detector configured to detect reflection of the laser. The RADAR unit 124 may be a sensor configured to sense objects in the environment in which the autonomous driving device 100 is located, using a wireless signal. In addition, the RADAR unit 124 may be configured to sense speeds and/or directions of the objects. The infrared sensor 125 may be a sensor configured to sense external objects in an environment in which the autonomous driving device 100 is located using a light of a wavelength of an infrared area.

The GPS 126, the magnetic sensor 127 and the accelerometer sensor 128 may be a sensor configured to acquire information relating to a velocity, direction, location, etc. of the autonomous driving device 100. For example, information relating to a current state of the autonomous driving device 100 may be acquired and a possibility of collision with an external object, etc. may be identified. The GPS 126 may receive a location of the autonomous driving device 100 as a latitude and altitude data through a satellite, and the magnetic sensor 127 and the accelerometer sensor 128 may identify the current state of the autonomous driving device 100 according to momentum of the autonomous driving device 100.

The storage 130 may store data necessary for the processor 140 to execute various processing, as described with reference to FIG. 2. For example, the storage 130 may be realized as an internal memory such as ROM, RAM and the like included in the processor 140, and may be realized as a separate memory from the processor 140. In this case, the storage 130 may be realized in the form of a memory embedded in the autonomous driving device 100, or may be realized in the form of a memory that may be detachable from the autonomous driving device 100 according to the usage of data storage. For example, data for driving the autonomous driving device 100 is stored in a memory embedded in the autonomous driving device 100, and data for an extension function of the autonomous driving device 100 may be stored in a memory that may be detached from the autonomous driving device 100. The memory embedded in the autonomous driving device 100 may be realized in the form of a non-volatile memory, volatile memory, flash memory, hard disk drive (HDD), solid state drive (SDD), or the like, and the memory that may be detached from the autonomous driving device 100 may be realized in the form of a memory card (e.g., micro SD card, USB memory), an external memory that is connectable to a USB port (e.g. USB memory), and the like.

The processor 140 may include a random access memory (RAM) 141, a read only memory (ROM) 142, a central processing unit (CPU) 143, and a bus 144. The RAM 141, the ROM 142, and the CPU 143 may be connected to each other through the bus 144. The processor 140 may be realized as a system on chip (SoC).

The RAM 141 may be a memory for reading, from the storage 130, various instructions, etc. related to driving of the autonomous driving device 100. The ROM 142 may store a set of instructions for system booting. In response to a turn on command being input to the autonomous driving device 100 and power being supplied, the CPU 143 may copy an O/S stored in the storage 130 into the RAM 141 according to a command stored in the ROM 142, and boot the system by executing the 0/S. If booting is completed, the CPU 143 performs various operations by copying various types of application programs stored in the storage 130 into the RAM 141 and executing the application programs copied into the RAM 141. The processor 140 may perform various operations using a module stored in the storage 110.

The communication interface 150 may include various communication circuitry and communicates with the autonomous driving device 100 and an external device. For example, the communication interface 150 may transmit and receive driving information of the autonomous driving device 100 and the external device. For example, the communication interface 150 may perform communication through various communication methods such as an Infrared (IR) communication, a Wireless Fidelity (WI-FI), Bluetooth, Zigbee, Beacon, near field communication (NFC), WAN, Ethernet, IEEE 1394, HDMI, USB, MHL, AES/EBU, Optical, Coaxial, and the like. However, according to circumstances, the communication interface 150 may communicate driving information through a server (not illustrated).

Figure 4:
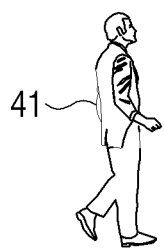
FIG. 4 is a diagram illustrating example driving of an autonomous driving device based on characteristic information, according to an example embodiment.
Figure 4:
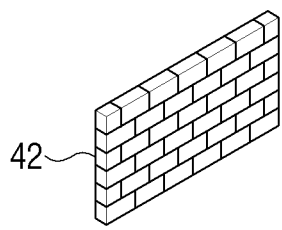
Figure 4:
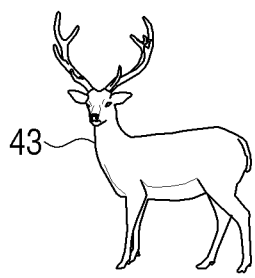
Figure 4:
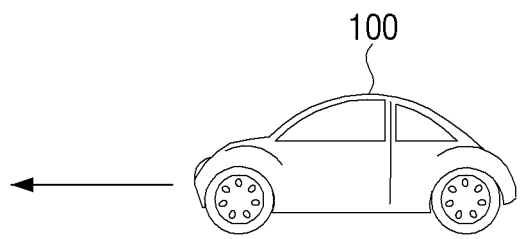
Figure 4:
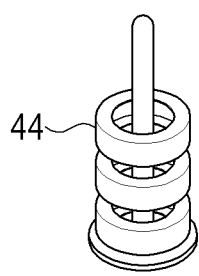
Figure 4:
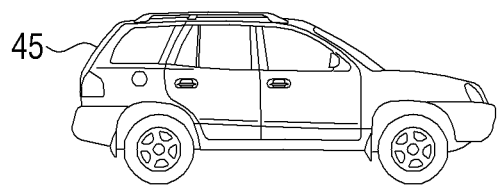

FIG. 4 is a diagram illustrating example driving of an autonomous driving device based on characteristic information, according to an example embodiment.

The sensor 120 according to an example embodiment may sense an obstacle. In this case, the obstacle may include a human 41, a structure 42, an animal other than human being 43, a fixed object of shock absorption materials 44, and a moving object 45 including an autonomous driving function.

The processor 140 according to an example embodiment may include various processing circuitry and control the driver 110 to change at least one of a velocity and direction of an autonomous driving device according to characteristic information corresponding to the human 41 or the structure 42. The characteristic information may include a size, color and shape of an object, a reaction velocity when a collision is expected, a movement direction when a collision is expected, a damage on collision, etc., but is not limited thereto.

For example, characteristic information corresponding to the human 41 may include information indicating that the obstacle is moving, that a moving speed is less than or equal to 10 km/h, that a moving direction when a collision is expected is a left or right side of a driving direction of the autonomous driving device 100, and that a damage to the human 41 on collision is serious.

As another example, characteristic information corresponding to the structure 42 may include information indicating that the obstacle is not moving, that a moving speed is 0, that the obstacle has no moving direction when a collision is expected, and that a damage to the autonomous driving device 100 on collision is serious.

Accordingly, in a case that the obstacle is a human 41, the processor 140 may identify that a damage to the human 41 on collision is serious, and in a case that the obstacle is a structure 42, the processor 140 may identify that a damage to a passenger of the autonomous driving device 100 on collision is serious.

Thereafter, the processor 140 may control the autonomous driving device 100 to come to a sudden stop, and control the driver 110 to change the direction of the autonomous driving device 100 to a direction in which a collision with the human 41 or the structure 42 is avoided.

Meanwhile, in a case that there is a possibility of collision with an animal 43 other than human or a fixed object 44 of shock absorption materials and another obstacle, the processor 140 according to an example embodiment may control the driver 110 to decelerate the autonomous driving device according to characteristic information corresponding to the animal 43 other than human or the fixed object 44 of shock absorption materials, and to maintain the direction.

In this case, the characteristic information corresponding to another obstacle may include information indicating that an on-collision damage is more as compared with the animal 43 or the fixed object 44 of shock absorption materials. For example, the another obstacle may include a human 41.

For example, characteristic information corresponding to the animal 43 other than human may include information indicating that the obstacle is moving, that a moving speed is approximately 20 km/h, that a moving direction when a collision is expected is a left or right side of a driving direction of the autonomous driving device 100, and that an on-collision damage to a passenger of the autonomous driving device 100 is relatively small.

As another example, characteristic information corresponding to the fixed object of shock absorption materials 44 may include information indicating that the obstacle is not moving, that a moving speed is 0, that the obstacle has no moving direction when a collision is expected, and that an on-collision damage to a passenger is relatively small.

Accordingly, in a case that the obstacle is the animal 43 other than human or the fixed object 44 of shock absorption materials, the processor 140 may identify that an on-collision damage to a passenger of the autonomous driving device 100 is relatively small based on the characteristic information.

Thereafter, to avoid collision with another obstacle excluding the animal 43 other than human or the fixed object 44 equipped with shock absorption materials, the processor 140 may control the driver 110 to decelerate the autonomous driving device 100 and maintain the direction.

In a case that there is a possibility of collision with the moving object 45 equipped with the autonomous driving function, the processor 140 according to an example embodiment may control the driver 110 to change at least one of a velocity and direction of an autonomous driving device according to characteristic information corresponding to the moving object 45 equipped with the autonomous driving function.

For example, characteristic information corresponding to the moving object 45 equipped with the autonomous driving function may include information indicating that the obstacle is moving, that a moving direction when a collision is predicted follows a driving algorithm of the moving object 45 equipped with the autonomous driving function, and that an on-collision damage to a passenger of the autonomous driving device 100 is relatively large. This will be described in greater detail below with reference to FIG. 5.

When there is a possibility of collision with a plurality of obstacles, the processor 140 according to an example embodiment may predict a damage at the time of collision with the respective obstacles based on characteristic information, and control the driver 110 to change the direction toward an obstacle with a minimum damage at the time of collision.

For example, in a case that the human 41 and the fixed object 44 of the shock absorption materials are sensed and that a possibility of collision with the respective obstacles exceeds a predetermined threshold, the processor 140 may control the driver 110 to change a driving direction of the autonomous driving device 100 toward the fixed object 44 of the shock absorption materials.

That is, in a case that no route on which a collision can be avoided other than a route on which the device collides with the human 41 or the fixed object 44 of shock absorption materials, the processor 140 may control the driver 110 to drive toward an obstacle with a small on-collision damage.

Figure 5:
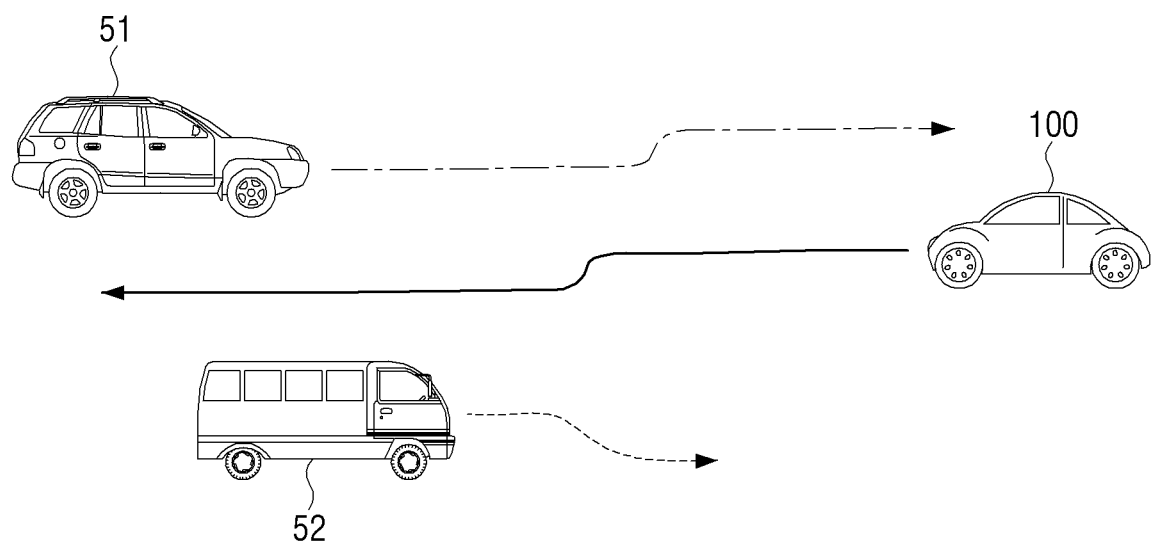
FIG. 5 is a diagram illustrating an example where an obstacle is a moving object equipped with an autonomous driving function, according to an example embodiment.

FIG. 5 is a diagram illustrating an example where an obstacle is a moving object equipped with an autonomous driving function, according to an example embodiment.

In a case that an obstacle is a moving object 51 and 52, the processor 140 according to an example embodiment may, based on a steering angle and degree of velocity change of the moving object 51 and 52, control the driver 110 to change a direction of the autonomous driving device 100 to a route on which a collision with the moving body 51 and 52 is avoided, and/or to decelerate the autonomous driving device 100.

For example, the processor 140 may sense a steering angle and degree of velocity change of the moving objects 51 and 52 through the sensor 120 in a situation where a collision is possible, and identify an autonomous driving algorithm of the moving objects 51 and 52.

The processor 140 may predict estimated velocities and estimated routes of the moving objects 51 and 52 according to the identified driving algorithm of the moving objects 51 and 52.

Thereafter, based on the predicted velocity and route estimations, the processor 140 may control the driver 110 to change a route of the autonomous driving device 100 to a route on which a collision with the moving objects 51 and 52 is avoided.

For example, in a case that there is a possibility of collision between the autonomous driving device 100 and the moving objects 51 and 52, when it is identified that the moving object 51 turns a steering wheel by +30° and reduces the velocity by 80%, the processor 140 may identify an autonomous driving algorithm of the moving object 51 is an autonomous driving algorithm of a manufacturer A, and predict an estimated route of the moving object 51 and avoid collision. In a case that there is a possibility of collision between the autonomous driving device 100 and the moving objects 52 and 52, when it is identified that the moving object 52 has been completely stopped by turning the steering wheel by −20° and decelerating by 100%, the processor 140 may identify an autonomous driving algorithm of the moving object 52 is an autonomous driving algorithm of a manufacturer B, and predict an estimated route of the moving object 52 and avoid collision. In this case, the storage 130 may pre-store an autonomous driving algorithm of another manufacturer, and receive the autonomous driving algorithm of another manufacturer from an external vehicle or a server via the communication interface 150 and store it.

The processor 140 may predict future driving directions and velocities of the moving objects 51 and 52 according to the identified autonomous driving algorithm, and control the driver 110 to change at least one of a direction and velocity of the autonomous driving device 100 so that a collision with the moving objects 51 and 52 is avoided.

Figure 6A:
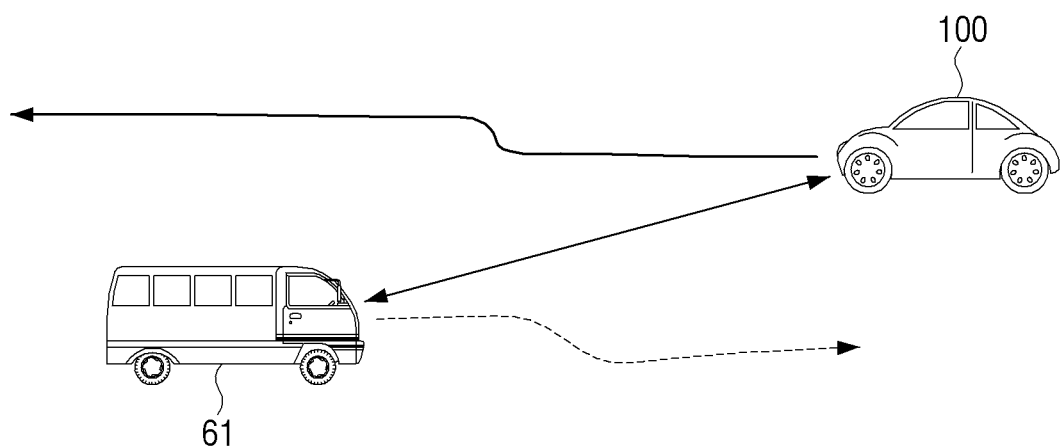
FIG. 6A is a diagram illustrating an example where an obstacle is a moving object equipped with an autonomous driving function, according to another example embodiment.

FIG. 6A is a diagram illustrating an example where an obstacle is a moving object equipped with an autonomous driving function capable of performing communication, according to another example embodiment.

Referring to FIG. 6A, the autonomous driving device 100 and the moving object 61 may communicate with each other in real time and exchange driving information with each other to thereby negotiate a driving route.

That is, according to an example embodiment, the autonomous driving device 100 may include a communication interface 150 for communicating with a moving object equipped with an autonomous driving function. The processor 140 may receive driving information of a moving object via the communication interface 150, and when the received driving information and the driving information of the autonomous driving device 100 are compared with each other and a possibility of collision is present, change a driving route of the autonomous driving device.

In this case, the driving information may include at least one of current locations, current velocities, current directions and current routes of the autonomous driving device 100 and the moving object 61.

Figure 6B:
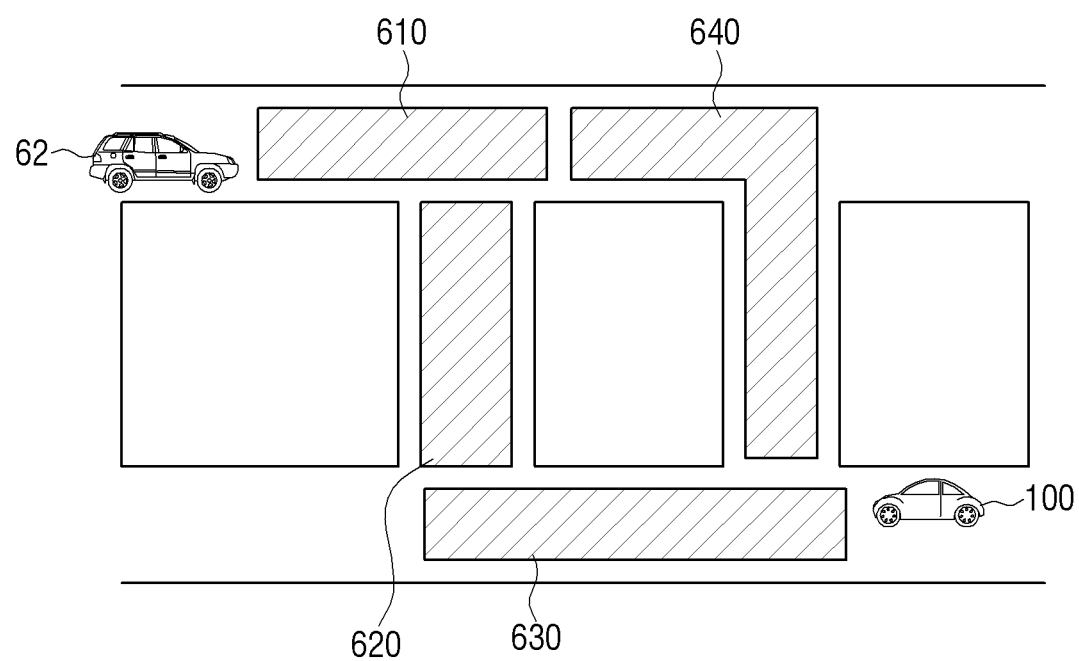
FIG. 6B is a diagram illustrating an example where an obstacle is a moving object equipped with an autonomous driving function, according to another example embodiment.

FIG. 6B is a diagram illustrating a process of negotiating routes of an autonomous driving device and a moving object equipped with an autonomous driving function capable of performing communication, according to an example embodiment.

Referring to FIG. 6B, the autonomous driving device 100 and the moving object 62 may be driven on a plurality of routes 610, 620, 630 and 640.

For example, the autonomous driving device 100 may set to drive through the route 630, the route 620, and then the route 610. Meanwhile, the moving object 62 may set to drive through the route 610, the route 620, and then the route 630.

In this case, the autonomous driving device 100 and the moving object 62 may communicate with each other, and the processor 140 may mutually compare at least one of current locations, current velocities, directions and routes, and identify whether there is a possibility of collision on the route 620. When the possibility of collision exceeds a predetermined threshold, the processor 140 may go round the route 620, and control the driver 110 to drive through the route 640 and to the route 610. The detail of the route negotiation will be described in greater detail below with reference to FIG. 6C.

In a case that a plurality of moving objects equipped with an autonomous driving function are present, the processor 140 may set an update period of driving information according to driving information of a moving object with the maximum collision possibility, and identify a possibility of collision with the moving objects for every route update period.

For example, the processor 140 may set such that the driving information update period decreases as a possibility of collision with the moving object is increased. Accordingly, it is possible to update driving information with high frequency, thereby reducing a possibility of collision with a moving object with a high possibility of collision.

Figure 6C:
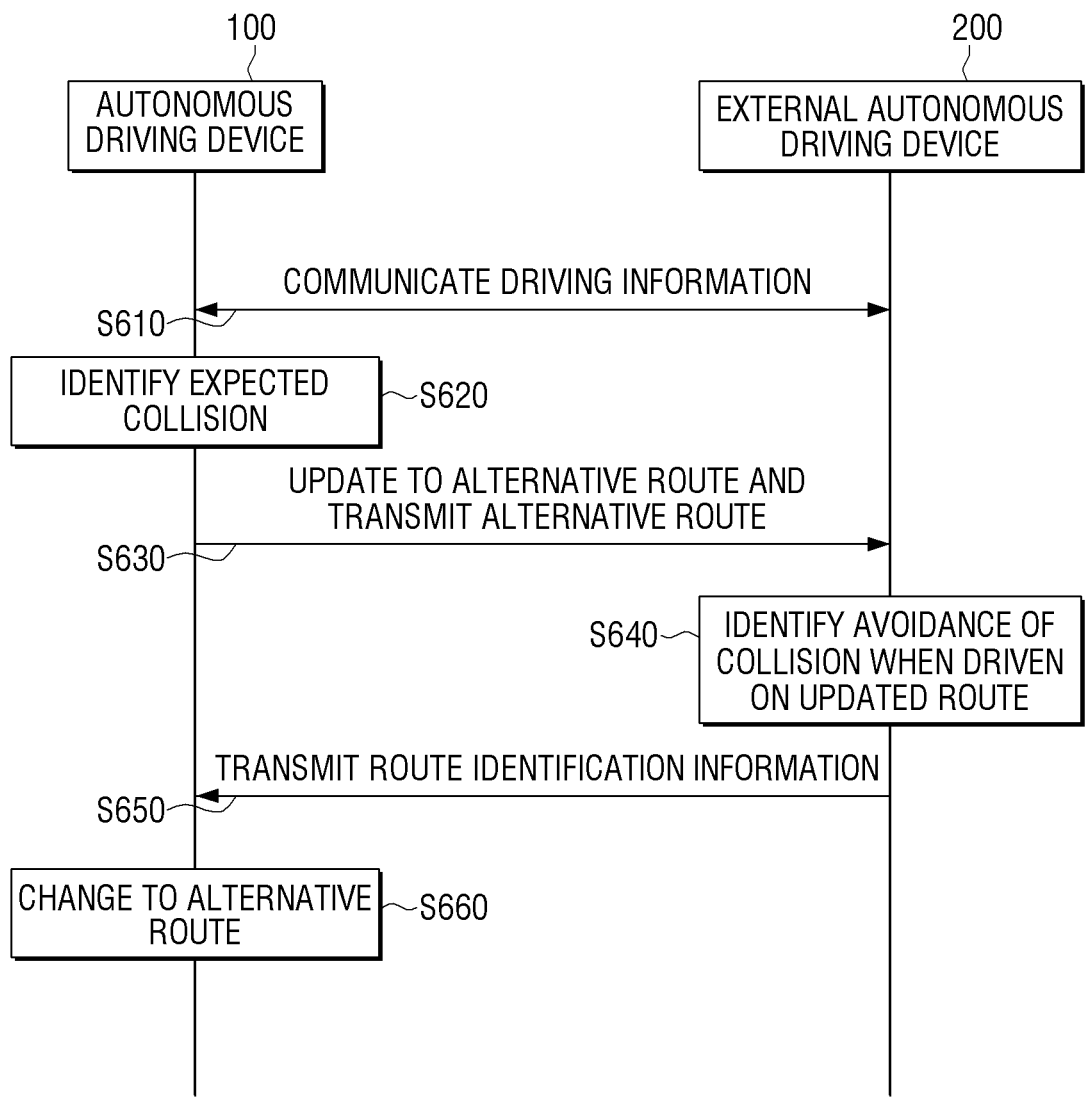
FIG. 6C is a sequence diagram illustrating an example communication process between a moving body equipped with an autonomous driving function and an autonomous driving vehicle.

FIG. 6C is a sequence diagram illustrating an example communication process between a moving body equipped with an autonomous driving function and an autonomous driving vehicle.

According to an example embodiment, an autonomous driving device 100 and an external autonomous driving device 200 may communicate driving information with each other, at operation S610. For example, the driving information may be communicated using a vehicle-to-everything (V2X) method, which may include at least one of a current location, a velocity, a direction, and a route.

Then, the autonomous driving device 100 may identify a situation where a collision is expected, at operation S620. For example, it may be identified that a possibility of collision may exceed a predetermined threshold on a particular route or at a particular location according to driving information of the autonomous driving device 100 and the external autonomous driving moving object 200.

Accordingly, the autonomous driving device 100 may update an alternative route with which a current route is replaced, and transmit information relating to the alternative route to the external autonomous driving moving object 200, at operation S630.

The external autonomous driving device 200 may identify that it is possible to avoid collision when the object is driven on the updated route, at operation S640. The alternative route updated by the autonomous driving device 100 is a route on which avoiding collision is possible.

The external autonomous driving device 220 may transmit route identification information indicating that the alternative route is effective, at operation S650.

The autonomous driving device 100 may receive the route identification information, and accordingly change the route to the alternative route at operation S660 and drive on the alternative route.

The processor 140 of the autonomous driving device 100 may, when a driving route is changed, transmit information about the changed route to the driving device 200 via the communication interface 150, and when receiving route identification information from the driving device 200, control the driver 110 to drive the autonomous driving device 100 to be driven along the changed driving route.

Meanwhile, in the steps of updating the alternative route and transmitting the updated alternative route at operation S630, and transmitting the route identification information at operation S650, a frequency of transmission/reception of data may increase as a possibility of collision is increased. For example, in a case that a plurality of moving objects are present, the processor 140 may increase the data transmission/reception frequency to first avoid a moving object with a highest possibility of collision from among the plurality of moving objects.

FIG. 7 is a flowchart illustrating an example method for driving an autonomous driving device, according to an example embodiment.

According to an example embodiment, an autonomous driving device 100 may be driven to drive along a predetermined driving route, at operation S710. Then, the autonomous driving device 100 driving along the predetermined driving route may sense an external object, at operation S720.

When the sensed external object is recognized as an obstacle with a possibility of collision with the autonomous driving device, a type of the obstacle may be determined based on characteristic information, at operation S730. For example, the sensed external object may be identified as an obstacle with a possibility of collision based on information such as a distance between the autonomous driving device 100 and the external object, and a velocity. In addition, after acquiring a feature value of an input image, the type of obstacle may be identified based on pre-stored characteristic information.

At least one of a velocity and direction of the autonomous driving device 100 may be changed according to the identified type at operation S740, and thereby a collision can be avoided. As described above, at least one of the velocity and direction of the autonomous driving device may be changed based on the obstacle type.

Meanwhile, at least some of the methods according to the various example embodiments may be implemented as an application which is installable in a related-art autonomous driving device.

Meanwhile, at least some elements of the methods according to the various example embodiments may be implemented solely by upgrading software or hardware for the related-art autonomous driving device.

In addition, at least some elements of the various example embodiments may be carried out through an embedded server provided in the autonomous driving device, or an external server of the autonomous driving device.

At least some elements of the various example embodiments may be embodied in recording media readable by a computer or a device similar thereto, by means of software, hardware, or a combination thereof. In some cases, at least some elements of the example embodiments described herein may be implemented as a processor itself. In a software configuration, at least some elements of the various example embodiments described in the disclosure such as a procedure and a function may be embodied as separate software modules. Each of the software modules may perform one or more of the functions and operations described herein.

Meanwhile, the computer instructions for carrying out a processing operation of the autonomous driving device according to the various embodiments described above may be stored in non-transitory computer-readable media. Computer instructions stored on such non-transitory computer-readable medium may cause a particular device to perform processing operations in the autonomous driving device according to various example embodiments described above when executed by a processor of the particular device.

The non-transitory computer readable medium refers to a medium that stores data semi-permanently and is readable by an apparatus. The aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing example embodiments and advantages are merely examples and are not to be understood as limiting the present disclosure. The present teaching may be readily applied to other types of devices. Also, the description of the example embodiments of the present disclosure is intended to be illustrative, and not to limit the scope of the claims, and many alternatives, modifications, and variations will be apparent to those skilled in the art.

What is claimed is:

1. An autonomous driving device, comprising:
   a driver comprising circuitry configured to drive the autonomous driving device;
   a sensor;
   a communication interface;
   a non-transitory storage for storing characteristic information on a plurality of types of obstacle, and driving algorithms of a plurality of autonomous driving devices wherein the characteristic information comprising moving characteristic information; and
   a processor configured to control the driver based on a result of sensing of the sensor,
   wherein the processor is further configured to:
   based on an external object sensed by the sensor being recognized as an obstacle with a possibility of collision with the autonomous driving device, receive driving information of the external object via the communication interface;
   identify whether the external object has an autonomous driving function based on the driving information of the external object and the driving algorithm stored in the non-transitory storage,
   based on identifying that the external object has the autonomous driving function, identify an autonomous driving algorithm of the external object based on at least the moving characteristic information of the external object,
   control the driver to change at least one of a velocity or a direction of the autonomous driving device based on at least the identified autonomous driving algorithm of the external object,
   based on identifying that the external object does not have the autonomous driving function, identify a moving characteristic comprising at least one of a moving speed of the external object, a moving direction of the external object, or a reaction velocity of the external object, and
   control the driver to change at least one of a velocity or a direction of the autonomous driving device based on at least the identified moving characteristic.

2. The autonomous driving device as claimed in claim 1, wherein the processor is further configured to control the driver to change a direction of the autonomous driving device toward an obstacle with a minimum on-collision damage from among a plurality of obstacles based on a plurality of obstacles being present.

3. The autonomous driving device as claimed in claim 1, wherein the processor is further configured to control the driver to control the autonomous driving device to come to a sudden stop, and to change a direction of the autonomous driving device to a direction in which a collision with the obstacle is avoided based on the obstacle being a person or a structural barrier.

4. The autonomous driving device as claimed in claim 1, wherein the processor is further configured to control the driver to decelerate the autonomous driving device, and to maintain a direction of autonomous driving device based on the obstacle being an animal other than human or a fixed object of a shock absorption material.

5. The autonomous driving device as claimed in claim 1, further comprising:
   wherein the processor is further configured to:
   compare the driving information with driving information of the autonomous driving device; and
   change a driving route of the autonomous driving device based on a collision being possible,
   wherein the driving information includes at least one of a current location, a velocity, a direction, and a route.

6. The autonomous driving device as claimed in claim 5, wherein the processor is further configured to:
   set an update period of driving information based on driving information of a particular external object of a plurality of external objects with a maximum possibility of collision based on the plurality of external objects being present; and
   identify a possibility of collision with the particular external object every update period of driving information.

7. The autonomous driving device as claimed in claim 5, wherein the processor is further configured to:
   transmit information relating to a changed route to the external object via the communication interface based on the driving route of the autonomous driving device being changed; and
   control the driver to drive the autonomous driving device along the changed driving route based on receiving route identification information from the external object.

8. A method for driving an autonomous driving device, the method comprising:
   driving the autonomous driving device along a predetermined driving route;
   sensing an external object;
   based on the sensed external object being sensed as an obstacle with a possibility of collision with the autonomous driving device, receiving driving information of the external object;
   identifying whether the external object has an autonomous driving function based on the driving information of the external object and driving algorithms of a plurality of autonomous driving devices;
   based on identifying that the external object has the autonomous driving function, identifying an autonomous driving algorithm of the external object based on at least moving characteristic information of the external object;

changing at least one of a velocity or a direction of the autonomous driving device based on at least the identified autonomous driving algorithm of the external object;

based on identifying that the external object does not have the autonomous driving function, identifying a moving characteristic comprising at least one of a moving speed of the external object, a moving direction of the external object, or a reaction velocity of the external object; and changing at least one of a velocity or a direction of the autonomous driving device based on at least the identified moving characteristic.

9. The method as claimed in claim 8, wherein the changing at least one of the velocity and direction of the autonomous driving device comprises changing a direction of the autonomous driving device toward an obstacle with a minimum on-collision damage from among a plurality of obstacles based on a plurality of obstacles being present.

10. The method as claimed in claim 8, wherein the changing at least one of the velocity and direction of the autonomous driving device comprises controlling the driver to control the autonomous driving device to come to a sudden stop, and to change a direction of the autonomous driving device to a direction in which a collision with the obstacle is avoided based on the obstacle being a person or a structural barrier.

11. The method as claimed in claim 8, wherein the changing at least one of the velocity and direction of the autonomous driving device comprises controlling the driver to decelerate the autonomous driving device, and to maintain a direction of autonomous driving device based on the obstacle being an animal other than human or a fixed object of a shock absorption material.

12. The method as claimed in claim 8, wherein the changing at least one of the velocity and direction of the autonomous driving device comprises:
comparing the driving information with driving information of the autonomous driving device; and
changing a driving route of the autonomous driving device based on a collision being possible,
wherein the driving information includes at least one of a current location, a velocity, a direction, and a route.

13. The method as claimed in claim 12, further comprising:
setting an update period of driving information based on driving information of a particular external object of a plurality of external objects with a maximum possibility of collision based on the plurality of external objects being present; and
identifying a possibility of collision with the particular external object every update period of driving information.

14. The method as claimed in claim 12, wherein the changing at least one of the velocity and direction of the autonomous driving device comprises:
transmitting information relating to a changed route to the external object via the communication interface based on the driving route of the autonomous driving device being changed; and
controlling the driver to drive the autonomous driving device along the changed driving route based on receiving route identification information from the external object.

* * * * *